June 23, 1925.  
W. H. KITTO, JR  
1,543,110  
AUXILIARY AIR VALVE  
Filed Nov. 5, 1919  
3 Sheets-Sheet 1

Inventor  
William Henry Kitto, Jr.

By [signature]  
Attorneys

June 23, 1925.  W. H. KITTO, JR  1,543,110
AUXILIARY AIR VALVE
Filed Nov. 5, 1919  3 Sheets-Sheet 2

Inventor
William Henry Kitto, Jr.
By
Attorneys

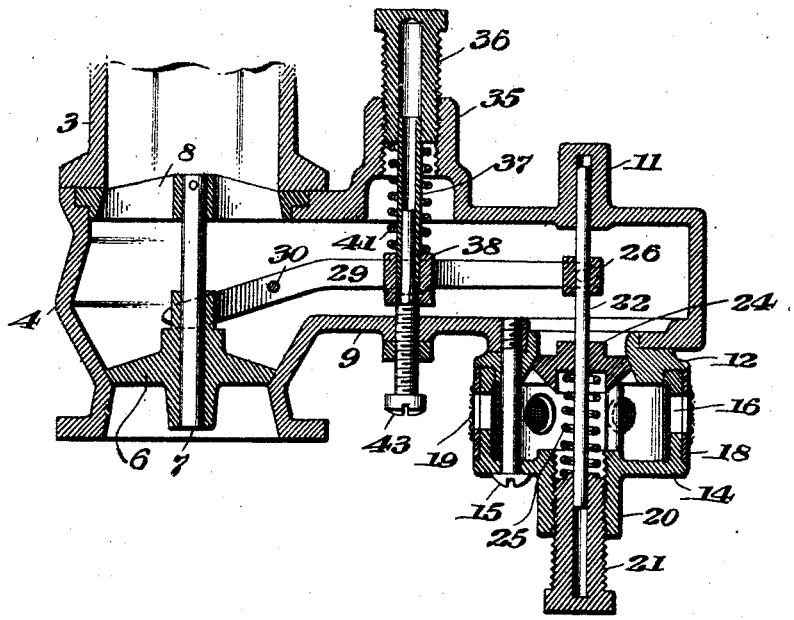
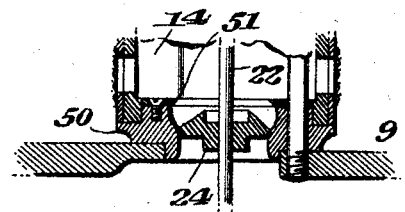

Patented June 23, 1925.

1,543,110

UNITED STATES PATENT OFFICE.

WILLIAM HENRY KITTO, JR., OF DETROIT, MICHIGAN.

AUXILIARY AIR VALVE.

Application filed November 5, 1919. Serial No. 335,824.

*To all whom it may concern:*

Be it known that I, WILLIAM HENRY KITTO, Jr., a subject of the King of Great Britain, residing at Detroit, in the county of Wayne and State of Michigan, have invented certain new and useful Improvements in Auxiliary Air Valves, of which the following is a specification, reference being had therein to the accompanying drawings.

It has been found that if air is admitted to the intake manifold of an internal combustion engine in addition to that utilized by the carbureter of the engine, that there is a saving of fuel, a smoother running of the engine, and a greater efficiency attained in many other respects. Numerous devices have been devised for automatically admitting air to the intake manifold of an engine at different points between the carbureter and the intake valve chambers or cylinders of the engine, but such devices have not proven a success for various reasons, mainly that of not being sufficiently sensitive to variations in the partial vacuum or suction produced in the intake manifold. The use of steam in auxiliary air inlet devices has been prohibitive due to the size and interference with other appurtenances of an engine, but above all is that of not responding to the requirements of an engine under various load conditions.

The primary object of my invention is to provide an auxiliary air valve, either in the form of a separate device or as an integral part of a carbureter, or as a built-in part of a carbureter, wherein novel adjustable tension devices are employed for controlling and regulating the action of the valve, and provision is made for screening and positively regulating the volume of air which may be used by my device in supplying the intake manifold with air in addition to that employed for vaporizing fuel in connection with the carburetting device of the engine.

Another object of this invention is to furnish an auxiliary air valve with primary and secondary regulating devices, the secondary device serving as a fulcrum during the movement of the valve when governed by the primary device, and the secondary device being brought into action when the primary device has reached its limit of action, the primary device responding to again control the valve after the secondary regulating device becomes inactive for the purposes for which it is intended.

A still further object of my invention is to furnish a pressure actuated valve which may be interposed between the carbureter and the intake manifold of an engine to normally close the outlet of a carbureter and associated with this valve is an air valve which is brought into action after a predetermined pressure has shifted the pressure actuated valve, and in this manner the fuel of a carbureter may be used as a rich mixture and made lean by commingling of air therewith so as to reduce the volume of the rich mixture to a point where an engine under normal or high speed conditions can be operated with greater fuel economy.

Still another object of my invention is to supply auxiliary air to the intake manifold of an internal combustion engine in such quantities that a perfect mixture is delivered to the engine cylinders at all speeds even though the ratio of the required auxiliary air supply to the speed of the engine varies considerably due to the peculiarities or imperfection of the carburetting device used.

A still further object of my invention is to provide an auxiliary air inlet valve wherein the parts are constructed with a view of reducing the cost of manufacture and at the same time retain those features by which durability, simplicity of construction and ease of assembling and regulating are secured. With such ends in view my invention resides in the novel construction to be hereinafter considered and then claimed and reference will now be had to the drawings, wherein—

Fig. 8 is a vertical sectional view of a modified form of the device, showing a rearrangement or reversal of some of the parts, and Fig. 9 is a detail sectional view of a constricted valve passage or valve seat member.

Figure 1:
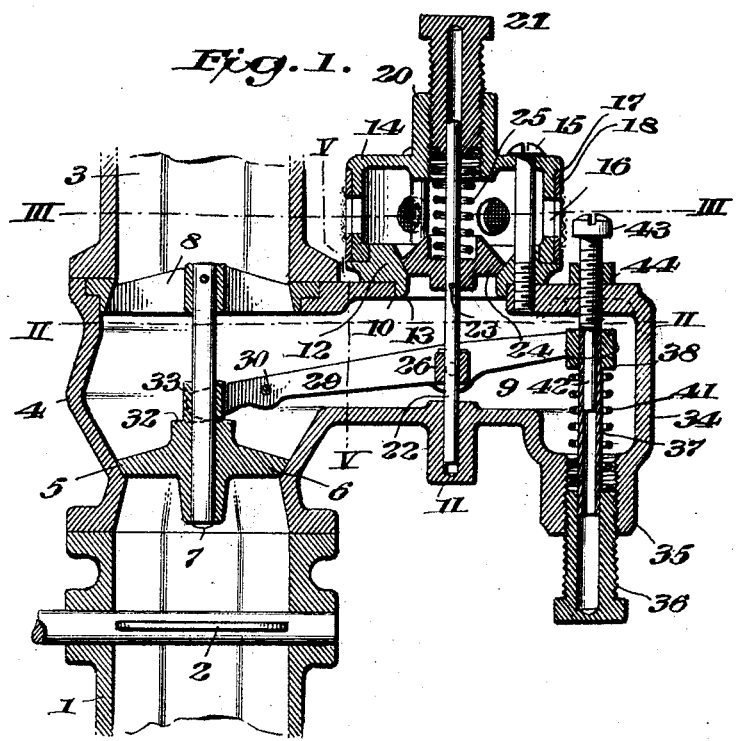
Figure 1 is a vertical sectional view of the auxiliary air inlet valve as interposed between a portion of a carbureter and the intake manifold of an engine, showing the operating or pressure actuated valve closed as though the engine were shut down.
Figure 2:
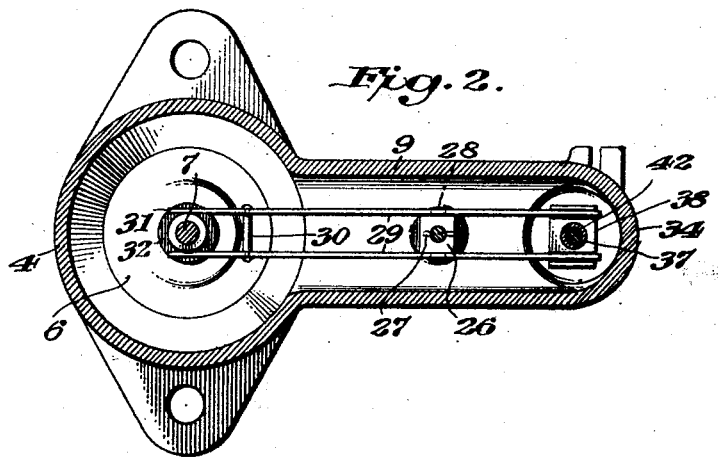
Fig. 2 is a horizontal sectional view taken on the line II—II of Fig. 1.

In the drawings, the reference numeral 1 denotes the outlet end of a carbureter which has the usual throttle or butterfly valve 2.

3 denotes the lower end of an intake manifold of an internal combustion engine, and instead of connecting this manifold direct to the end of the carbureter, as is the usual practice, I interpose a valve body 4 which has its upper and lower ends connected to the ends of the carbureter and the manifold with the valve body 4 somewhat globular and its lower portion formed to provide a valve seat 5 for an operating or pressure actuated valve 6 slidable on a depending stem 7 mounted in a spider 8 seated in the upper end of the valve body 4 and retained therein by any suitable means.

9 denotes a hollow side extension communicating with the valve body 4 and the top of said side extension has an opening 10 with the axis thereof vertically alining with the boss or guide 11 carried by the lower wall of the side extension 9.

12 denotes a valve seat member having a reduced end or pilot 13 fitted in the opening 10 and mounted on the valve seat member 12 is a cylindrical air inlet cage 14 which is connected to the valve seat member 12 by a plurality of screw bolts 15 extending through said cage and the valve seat member 12 into the top wall of the side extension 9, or by other suitable means, so as to retain the valve seat member 12 on said side extension, just as though the cage and the valve seat member were formed integral with the hollow side extension of the valve body.

Figure 3:
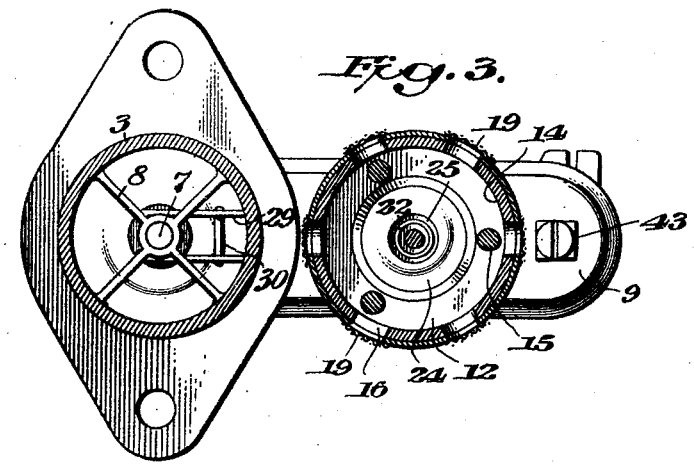
Fig. 3 is a similar view taken on the line III—III of Fig. 1.
Figure 4:
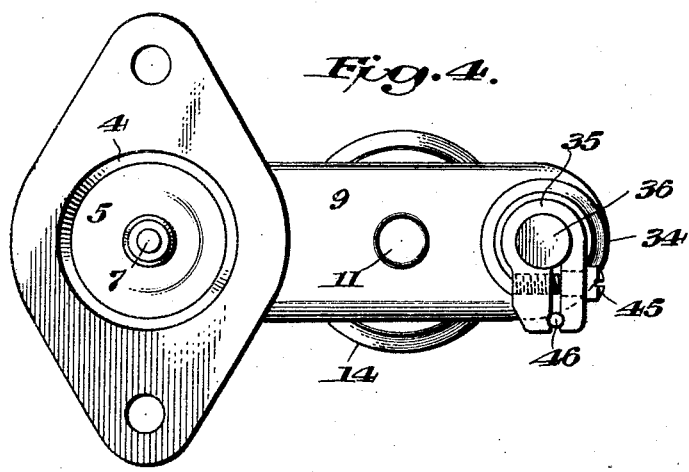
Fig. 4 is a bottom plan of the valve.
Figure 6:
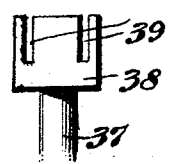
Fig. 6 is an elevation of a compensating block forming part of the primary regulating device.
Figure 5:
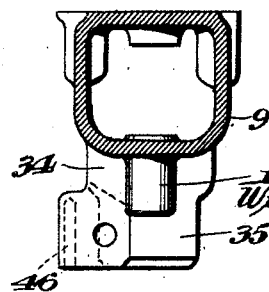
Fig. 5 is a cross sectional view of a portion of a naked valve body with the view taken on the line V—V of Fig. 1.

16 denotes a series of openings or apertures in the annular wall of the cage 14 and the outer side of said cage has a circumferential groove 17 for an annular apertured shutter 18 adapted to have the apertures thereof register with the apertures 16 of the cage. The shutter 18 may be shifted to regulate the passage of air into the air inlet cage and to completely shut off the supply of air to the auxiliary air valve when the engine is cold. To exclude dust and other foreign matter the shutter 18 has its apertures covered by screens or pieces of gauze 19, as best shown in Fig. 3.

20 denotes a central interiorly screwthreaded boss carried by the top of the cage 14 and adjustable in said boss is a guide plug or screw 21 for a valve rod 22, said rod extending into the boss or guide 11 of the hollow side extension 9. Fixed on the rod 22 by a pin 23 or other fastening means is a conical air inlet valve 24 adapted to engage the valve seat member 12, said valve being yieldably held on the member 12 by a coiled compression spring 25 which encircles the valve rod 22 between the valve 24 and the plug or screw 21, said spring having its lower portion seated in a recess provided therefor in the upper end of the valve 24.

26 denotes a fulcrum bearing on the valve rod 22 and retained in active relation thereto by a pin 27 or similar means. The fulcrum bearing is preferably rectangular and has opposed walls thereof provided with transversely alining fulcrum pins or studs 28 for parallel side arms 29 constituting a valve lever. The fulcrum pins or studs 28 may conveniently be in the form of rivets that may have the ends thereof upset to prevent displacement of the lever arms 29. The inner ends of the lever arms are connected by a spacing rivet 30 and said arms terminate in heads 31 bearing on an annular shoulder 32 at the sides of the upper reduced end 33 of the operating or pressure actuated valve 6.

24 denotes a chambered enlargement at the outer end of the side extension 9 and into which the outer end of the valve lever extends. The lower end of the chambered enlargement 34 is formed with an interiorly screwthreaded split or bifurcated boss 35 for an adjustable guide plug or screw 36 into which slides a tube 37 having the upper end thereof provided with a compensating block or head 38 engaged by the outer end of the valve lever. The boss 35 has its split end provided with a spacing pin 46 and a screw 45, so that the intermediate portion of the boss may be contracted about the plug or screw 36 to clamp or lock it in an adjusted position.

Figure 7:
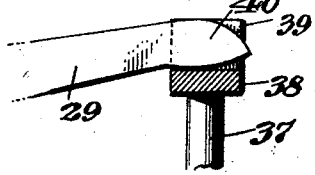
Fig. 7 is a cross sectional view of the same.

The block or head 38 has grooves or kerfs 39 to receive the pivot heads 40 of the lever arms 29 and the walls of the grooves or kerfs 39 prevent lateral displacement of the outer ends of the lever arms 29. By reference to Fig. 7 it will be observed that the pivot heads 40 have lower convex or curved edges bearing on the compensating block or head 38 and with the head in a raised position in the chambered enlargement 34 the valve lever has less leverage than with the compensating head in a lowered position, since the distance between the fulcrum bearing 26 and the actual contact between the valve ever and compensating block will vary according to the position of said compensating head and to the angle at which valve lever stands to compensating block. To permit of this it is necessary that the valve lever have a sliding and rocking movement on the compensating head; such difference in leverage being essential for a very minute adjustment of the air inlet valve 24. The outer end of the valve lever may be connected to the compensating block by means of a slot in each parallel side arm engaging with pins projecting from the sides of compensating block, or any suitable connection may be established which will effect a desired movement.

41 denotes a coiled compression spring, exerting pressure between the compensating block or head 38 and the inner end of the guide plug or screw 36, and extending into the tube 37 is the reduced lower end or pilot 42 of a stop screw 43 adjustable in the top of the chambered enlargement 34, said stop screw being held in adjusted position by a jam nut 44 or like holding means. With the compensating block or head 38 integral or otherwise fixed relative to the tube 37 the screw 43 will serve as a stop to limit the upward movement of the tube 37 on the reduced end 42 of the screw 43, and the tension of the spring 41 may be increased or decreased by adjusting the guide plug or screw 36.

In practice the best tension of the spring 41 for a desired result will be determined and then the adjustable plug or screw 36 locked by the clamping screw 45. The predetermined adjustment is also preferable in connection with the plug or screw 21, as I aim to have the auxiliary air inlet device automatic throughout and when once adjusted for proper operation the device requires no attention whatsoever. The screw 21 can be locked similar to the screw 36.

In operation, I will assume that the internal combustion engine is started by opening the throttle 2 and cranking or otherwise turning over the engine shaft so that the pistons in the engine cylinders will reduce the atmospheric pressure above the valve 6 and draw sufficient explosive mixture into the cylinders of the engine to place the same in operation, for instance, with the engine idling. The initial reduction of atmospheric pressure above the valve 6 unseats said valve and permits of sufficient explosive mixture passing by said valve, consequently the inner end of the valve lever is raised, but since said valve lever is pivoted on the valve rod, and said valve rod held by the tension of the spring 25 and by the atmospheric pressure on the outside of valve 24 the outer end of said valve lever will be lowered against the action of the spring 41. In compressing the spring 41 there is a change in the pivot point of the valve lever on the compensating head or block 38, from that of a short leverage to a long one and the elements 37, 38 and 41 have now been brought into action as a primary regulating means which for the time being serves as a pivot for the lever of the valve 6. During the time when throttle 2 is in more nearly closed position, the vacuum inside the body 4 is at its maximum, consequently the atmosphere exerts a greater pressure on the valve cage side of air valve 24 at this time than when throttle 2 is in open positions, thereby tending to hold valve 24 on its seat in cooperation with spring 25. It is apparent that during this period, the valve 25 is harder to raise from its seat than at wide throttle positions when the vacuum in body 4 is reduced, and it is for this reason that the leverage of the valve lever is greater during the period that the valve 24 is the hardest to open.

Immediately upon the speed of the engine being increased by opening the throttle of the carbureter there is a greater flow of mixture by the valve 6 and said valve is further opened to a point that permits an amount of the mixture from the carbureter to flow past it, sufficient to equalize the pressure above and below it, the valve 6 virtually "floating" in the flow of mixture. At the higher engine speed, when the vacuum in the body 4 is at its lowest, the spring 41 is able, on account of its leverage over the valve, 24 to open the latter. This time the primary regulating means continues as a pivot for the valve lever and permits said valve lever to raise the valve rod 22 against the pressure of the atmosphere and the tension of the spring 25, which together with the adjustable plug or screw 21 constitutes the secondary regulating means in connection with the entire device. As the rod 22 is raised the air inlet valve 24 is unseated and consequently air is drawn through the air inlet cage 14 and the valve seat member 12 into the hollow side extension of the valve body 4, and then upwardly through the spider 8 into the end 3 of the intake manifold of the engine, the air commingling with the explosive mixture and providing a leaner mixture. It is therefore apparent that after the engine is placed at a greater speed than when idling that the primary and secondary regulating means will cooperate to insure a proper position of the air inlet valve 24 relative to the valve seat member 12 so that there will be a proper amount of air admitted to the valve body 4 for commingling with the explosive mixture. This is automatically taken care of by the operating or pressure actuated valve 6 placing the primary and secondary regulating means in cooperative conditions for moving the air inlet valve 24.

At the higher engine speeds when the vacuum in the body 4 is at its lowest point and the atmosphere offers the least resistance to the opening of the air valve 24, the spring 41 is able to return the compensating block 38 to the end of the stop screw 43 owing to the leverage the compensating block 38 has over the air valve spring 25 and owing to its having only the spring 25 to overcome; the influence of the atmospheric pressure on the valve 24 being practically negligible at this time. This return of the compensating block 38 opens the air valve 24 still further, the valve 6 acting as a pivot for the inner end of the valve lever 29.

When the throttle of the carbureter is partially or completely closed, the valve 6 is less affected because of the reduced volume of mixture passing by it, and it returns in the direction of its seat to a point dependent on the amount of gas mixture allowed to pass around it by the carbureter throttle. This return movement of the valve 6 permits the compensating head 38 to return to the end of the stop screw 43, if it has not already done so, before the engine speed was reduced.

The secondary regulating means then comes into action to partially or completely close the air inlet valve 24, its position being dependent on the position of valve 6 which in turn is dependent on the flow of gas throttle 2 permits to pass into body 4. When the speed of the engine has dropped to the point at which throttle allows engine to work the whole device takes up its work and functions as already described.

From the foregoing it will be observed that I have devised novel means for automatically admitting air to the intake manifold of the engine wherein a member is constantly under the influence of the flow of gas mixture from the carbureter to establish communication between the manifold and the atmosphere when predetermined speeds of the engine are reached, the degree of communication being in proportion and completely controlled by the vacuum pressure in the manifold. The primary regulating means can be easily adjusted to render the valve 6 sensitive to any vacuum pressure greater than the expansive force of the spring 41, while the secondary regulating means and the stop screw 43 may be adjusted so that there is a predetermined use of fuel before an auxiliary admixture of air therewith.

While I have shown and described my invention as outlined above and illustrated in Fig. 1, which shows a device made into a separate unit and located between the carbureter and the manifold of an engine, it is understood that the mechanism can be constructed in and as an integral or built-in part of a carbureter above the throttle valve; also that while I have shown the auxiliary air valve 24, valve seat 12 and other parts of the air inlet mechanism located over and operated by the central portion of the lever 29 by means of stem 22, I can get the same results by constructing it with the auxiliary air valve located in its cage or seat, but mounted on the under side of the outer end of body 34, and the parts shown in said outer end chamber of body 34 located in the position of the air valve shown in Fig. 1 as illustrated in Fig. 8, the same identifying numerals being used in each instance.

A further modification of the invention is shown in Fig. 9, a valve seat member 50 is designed so that the device may act as a corrective agent for certain imperfections in carbureters or engines. The valve seat member 50 is intended for the air inlet cage 14 and the valve 24 associated therewith, and said valve seat member has a constricted upper portion provided by a detachable member 51 attached to the valve seat member 50, said valve seat member 50 being made in two parts so that the valve 24 may be easily installed. The cooperation between the members 50 and 51 is such that the valve opening above the valve seat can be made of such a contour or cross sectional area as to vary the proportion of the volume of air passing between the valve 24 and the valve seat member 50 to the left of the valve, thereby varying the proportion of the volume of auxiliary air to the speed of the engine. The contour may be of such form as to change the volume of the air to successively increase and decrease as many times as desired during the travel of the valve in one direction, when being raised or lowered; and it will be noted that when the valve 24 is intermediate the upper and lower edges of the valve seat member 50 that there is a greater passage for air than when the valve approaches either end of the valve seat member. This constricted passage may be used in connection with my device where it is desired to rectify certain imperfections in connection with a carbureter.

What I claim is:

1. An auxiliary air inlet device for the intake manifold of an internal combustion engine, comprising a valve body having a side extension, a valve adapted to admit air to the side extension of said valve body, a lever adapted to open said valve, means in said valve body actuated by fluid passing therethrough adapted to effect said lever to open said valve, and means carried by the side extension of said valve body adapted to be adjusted to change the leverage of said valve lever.

2. An auxiliary air inlet device for the intake manifold of an internal combustion engine, comprising a valve body having a side extension, an air inlet cage carried by the side extension of said valve body and adapted to admit air thereto, a valve opening into said air inlet cage, a fulcrum lever articulated with said valve, means in said valve body adapted to actuate said lever to open said valve, adjustable means carried by the side extension of said valve body serving as a fulcrum for said lever.

3. A device as characterized in claim 2, wherein adjustable means in said air inlet cage maintains said valve normally seated and may be regulated to control the opening of said valve.

4. An auxiliary air inlet device for the intake manifold of an internal combustion engine comprising a valve body interposed in the intake manifold of the engine and having a side extension communicating therewith, an air inlet valve associated with the side extension of said valve body, a valve in said valve body, and means articulating said valves so that said valves may move simultaneously in parallel planes and in the same direction.

5. A device as characterized in claim 4, wherein means carried by the side extension of said valve body may be adjusted to regulate the movement of one valve relative to the other.

6. An auxiliary air inlet device for an internal combustion engine adapted to admit air to the intake manifold of the engine to commingle with the explosive mixture supplied thereto, comprising a pressure actuated valve under the influence of an explosive mixture and operatively susceptible to a pressure produced by the engine, a lever connected to said pressure valve, an air inlet valve connected to said lever intermediate the ends thereof and supporting said lever during an opening movement of said pressure valve adapted to be opened by said lever, and means engaging an end of said lever to retard the opening movement of said pressure valve, said means causing a change in the leverage of said lever to increase the retarding action thereof relative to the air inlet valve.

7. An auxiliary air inlet device for an internal combustion engine adapted to admit air to the intake manifold of the engine to commingle with the explosive mixture supplied thereto, comprising a pressure actuated valve under the influence of the explosive mixture and operatively susceptible to a pressure produced by the engine, a lever connected to said pressure valve, an air inlet valve connected to said lever intermediate the ends thereof, said lever being supported by said air inlet valve during an opening movement of said pressure valve, and means engaging an end of said lever to retard an opening movement of said pressure valve.

8. An auxiliary air inlet device for an internal combustion engine adapted to admit air to the intake manifold of the engine to commingle with the explosive mixture supplied thereto, comprising a pressure actuated valve under the influence of the explosive mixture and operatively susceptible to a pressure produced by the engine, a lever connected to said pressure valve, an air inlet valve connected to said lever intermediate the ends thereof and adapted for supporting said lever during an opening movement of said pressure valve, and means cooperating with atmospheric pressure on said air inlet valve in maintaining said air inlet valve closed, said means adapted to be overbalanced by pressure against said pressure valve so as to serve as a pivot for said lever whereby said pressure valve may open said air inlet valve.

9. An auxiliary air inlet device for an internal combustion engine adapted to admit air to the intake manifold of the engine to commingle with the explosive mixture supplied thereto, comprising a pressure actuated valve under the influence of the explosive mixture and operatively susceptible to a pressure produced by the engine, a lever connected to said pressure valve, an air inlet valve connected to said lever intermediate the ends thereof and adapted to support said lever during an opening movement of said pressure valve and adapted to be opened by said lever, and means engaging an end of said lever adapted to retard the opening movement of said pressure valve, said means causing a change in the leverage of said lever so that said air inlet valve will have its adjustment in proportion to fluctuation in the pressure at said pressure valve.

In testimony whereof I affix my signature in the presence of two witnesses.

WILLIAM HENRY KITTO, JR.

Witnesses:
KARL H. BUTLER.
G. E. McGRANN.